US007065565B2

(12) United States Patent
Dini (10) Patent No.: US 7,065,565 B2
(45) Date of Patent: Jun. 20, 2006

(54) SYSTEM AND METHOD FOR POLICY-ENABLED, CONTRACT-BASED MANAGEMENT OF NETWORK OPERATIONAL SUPPORT SYSTEMS

(75) Inventor: Petre Dini, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 762 days.

(21) Appl. No.: 10/085,362

(22) Filed: Feb. 27, 2002

(65) Prior Publication Data

US 2003/0163559 A1 Aug. 28, 2003

(51) Int. Cl.
*G06F 15/177* (2006.01)

(52) U.S. Cl. ............... 709/222; 709/220; 709/221; 709/223; 709/226; 709/227; 709/229; 370/229; 370/230; 370/231; 370/232

(58) Field of Classification Search .......... 709/222, 709/220, 221, 223, 226, 227, 229; 370/229, 370/230, 231, 232
See application file for complete search history.

(56) References Cited

U.S. PATENT DOCUMENTS

| 5,838,918 | A |  | 11/1998 | Prager et al. |  |
| 5,889,953 | A |  | 3/1999 | Thebaut et al. |  |
| 6,314,520 | B1 | * | 11/2001 | Schell et al. | 713/200 |
| 6,459,702 | B1 | * | 10/2002 | Saaverda et al. | 370/422 |
| 6,539,425 | B1 | * | 3/2003 | Stevens et al. | 709/220 |
| 6,714,515 | B1 | * | 3/2004 | Marchand | 370/231 |
| 6,785,756 | B1 | * | 8/2004 | Candea et al. | 710/220 |
| 6,804,328 | B1 | * | 10/2004 | Perry et al. | 379/22 |
| 2003/0088711 | A1 | * | 5/2003 | Tabares et al. |  |

FOREIGN PATENT DOCUMENTS

EP 1 026 867 A2 8/2000

OTHER PUBLICATIONS

D. J. Milham, et al., "European ATM Service Introduction—OSS Interconnection between Operators," Apr. 10, 2000, IEEE, XP010376687, pp. 247-260.
E. Meier, et al., "Policy-Enabled Applications", Technical Report TR-14-99-05, Jul. 1999, 10 pages.
S. Boros, "Policy-Based Network Management With SNMP", CTIT Technical Report Series, No. 00-16, ISSN 1381-3625, Oct. 2000, pp. 1-8.

* cited by examiner

*Primary Examiner*—Zarni Maung
*Assistant Examiner*—Glenford Madamba
(74) *Attorney, Agent, or Firm*—Hickman Palermo Truong & Becker, LLP (57) ABSTRACT

A method and apparatus is disclosed for policy-enabled, contract-based management of network operational support systems. A policy kernel utilizes multiple policy access points for interfacing to dedicated policy management systems. The policy kernel uses policy views, containing a set of required policies, to request the policy view from the policy management system. The policy view initiates a contract for regulating the selection and import of executable policies to the policy kernel. The contract applies running components to the executable policies to enable them to run on the policy kernel and resolves any potential conflicts by applying a set of policy dependency rules to any executable policies that are in variance with one another. The executable policies are imported into the policy kernel through the policy access point. The policy kernel may then implement the requested policy view by executing the executable policies thus imported.

26 Claims, 5 Drawing Sheets

SYSTEM AND METHOD FOR POLICY-ENABLED, CONTRACT-BASED MANAGEMENT OF NETWORK OPERATIONAL SUPPORT SYSTEMS

FIELD OF THE INVENTION

The present invention generally relates to data processing in the field of network management. The invention relates more specifically to a system and method for policy-enabled, contract-based management of network operational support systems.

BACKGROUND OF THE INVENTION

In modern communications systems, there are a variety of service providers. Service providers include Internet Service Providers (ISPs) that provide access to the Internet, email and Web Hosting; Application Service Providers (ASPs) that offer portals to value-added hosted or managed applications; Network Service Providers (NSPs) that offer private services to companies, particularly international point-to-point connections and managed VPNs; and wireless operators that offer data services. Service providers such as these typically manage and provision these services using an operational support system (OSS). An OSS comprises a set of programs designed to support various telecommunication network management functions, including monitoring, controlling and analyzing problems in a computer network.

Moreover, as traditional voice telephone systems gradually converge with packet-oriented Internet traffic (including Voice over IP), broadband applications (such as teleconferencing), and DSL, more sophisticated systems are needed to support service provider activities such as ordering, billing, reporting, and tracking of usage and network components (including IP addresses).

An OSS is designed and built to conform to the specific requirements of the service provider. Typically, the behavior of the OSS is monitored and managed by a policy management system. Policy management systems are typically implemented as either embedded systems or peer systems.

An embedded policy management system is one in which both the OSS and the policy management system are bundled together, typically on a chip. In embedded systems, the code performing the operational functions is intermingled with the code performing the policy management functions. However, in this arrangement the policy management system is non-scalable and inflexible. For example, in a large distributed network controlled by an embedded policy management system, it is cumbersome, if not impossible, to capture changes in system evolution, system requirements or user behavior.

A peer policy management system is one in which the OSS and the policy management system operate as separate and independent systems, but only one policy management system, tailored to affect the behavior of the OSS, can be coupled to the OSS. Peer systems have many disadvantages. First, in large distributed networks where there may be many owners, each with specific policy management needs, multiple policy management systems are required to provide cooperation between the many management issues of the owners. Additionally, a single policy management system may not have the capacity to handle all the various problems occurring within a single OSS. Also, it is very difficult for a single policy management system to manage user behavior from one subsystem to the next. Finally, it is difficult to manage an OSS when the policy management system goes down or the interactions between the systems fail.

Both embedded and peer policy management systems may be classified as "policy-based" systems. Policy-based systems are those that re-use successful management decisions, forming a collection of policy rules that can control the behavior of the OSS. Policy-based systems constrain the OSS because the OSS is only able to use the exclusive rules of the policy-based management system. Therefore, any changes in policy management rules result in the need to either change the code (for embedded systems) or the configuration of an external policy management system (for peer systems). In either event, a new product must be added or built. This severely curtails the scalability of systems used by a service provider.

Based on the foregoing, there is a clear need for a system and method of managing an OSS using one or more external policy management systems to effectively and economically enhance scalability. Unlike standard policy-based management systems that are either embedded into the OSS or can access only one external policy management system, there is a need for a policy-enabled management system that can access and implement multiple external policy-based systems. The policy-enabled system must provide access to the available external policy management systems, determine the best external policy management system to use, regulate the exchange of policies between the external policy management system and the OSS, and correlate differing polices and resolve conflicts.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

The foregoing needs, and other needs and objects that will become apparent for the following description, are achieved in the present invention, which comprises, in one aspect, a method for policy-enabled, contract-based management of an operational support system.

In one embodiment, an operational support system has a policy kernel that includes multiple policy access points, each dedicated to a policy management system. The policy kernel uses policy views that contain a set of required policies. The policy kernel enables the policy access point that corresponds to the policy management system best suited to provide the desired policy view, and requests the policy view from that policy management system. The policy management system then initiates a contract from the policy view for regulating the selection of executable policies available in the policy management system that are subsequently imported by the policy kernel.

The contract instructs an external policy engine in the policy management system to provide executable policies that are capable of supporting the required policies and prepares the executable policies for import by the policy kernel. Before the policy kernel imports the executable policies, the contract applies running components to the selected executable policies to enable them to run on the policy kernel. Also, the contract resolves any potential conflicts by applying a set of policy dependency rules to any executable policies that are in variance with one another.

The selected executable policies are imported by the policy kernel from the policy management system through the policy access point using a policy export engine of the policy management system. The policy kernel may then implement the requested policy view by executing the selected executable policies thus imported.

In other aspects, the invention encompasses an apparatus and a computer readable medium configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for view-based, self-managed, policy-enabled management of operational support systems is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
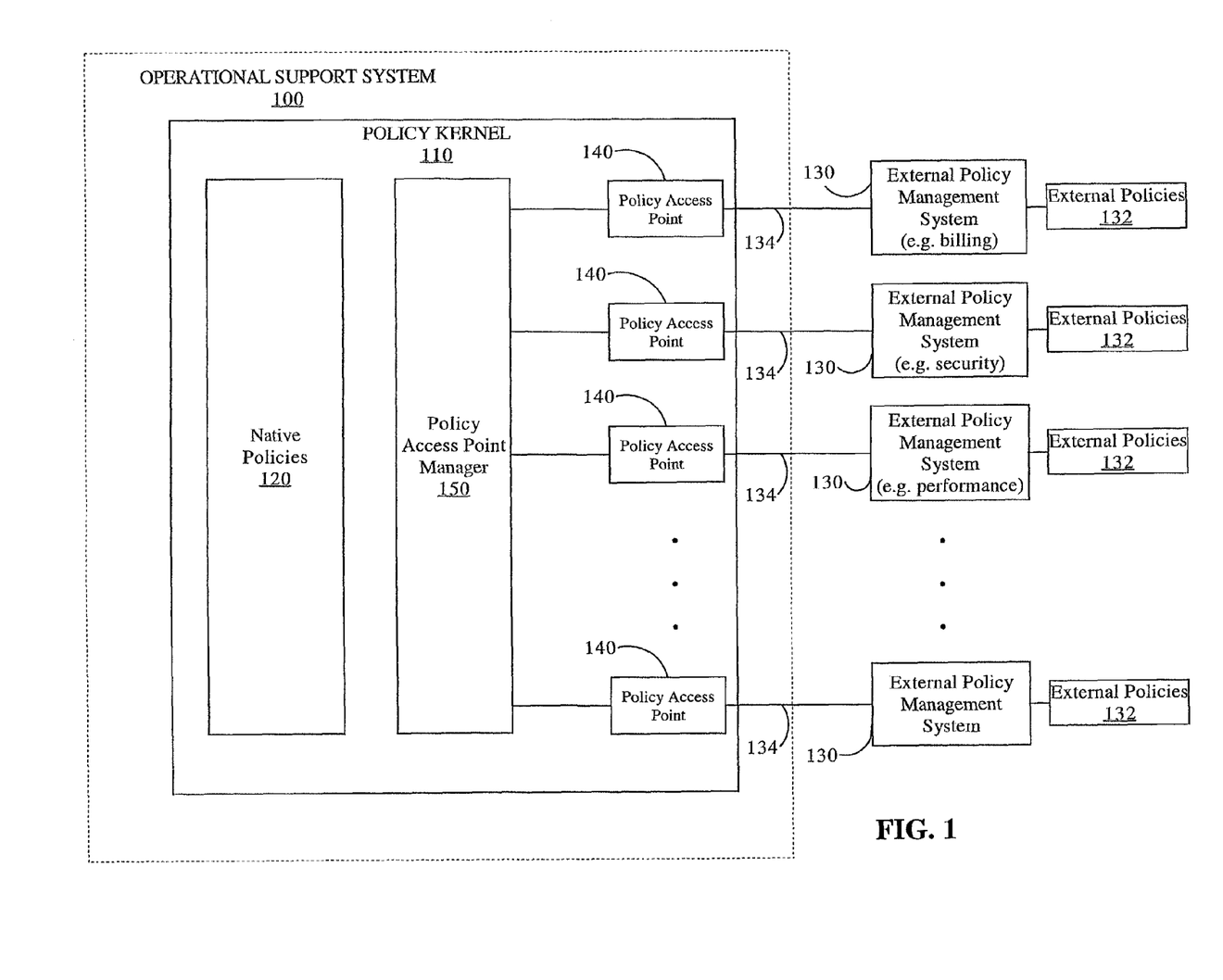
FIG. 1 is a block diagram that illustrates an overview of an operational support system utilizing one aspect of the invention.

Embodiments are described herein according to the following outline:
1.0 STRUCTURAL OVERVIEW
2.0 FUNCTIONAL OVERVIEW
3.0 IMPLEMENTATION MECHANISMS—HARDWARE OVERVIEW
4.0 EXTENSIONS AND ALTERNATIVES 1.0 STURCTURAL OVERVIEW FIG. 1 illustrates a schematic of an operational support system 100. Operational support system 100 is designed and built around a set of predetermined administrative user requirements, such as specific mechanisms for adding and removing service subscribers and provisioning services, and comprises a policy kernel 110. Policy kernel 110 is a policy management module that implements management policies on operational support system 100. In one aspect of the invention, policy kernel 110 uses the concept of system views. System views may include business views, services views, network views, etc. The use of policy views is discussed in more detail in reference to FIG. 2. In another aspect of the invention, policy kernel 110 is embedded into a firmware or software package of a machine that executes OSS 100.

Policy kernel 110 comprises a set of native policies 120. Native policies 120 are a set of policies or rules that are based on user requirements in the design of operational support system 100. Native policies 120 are predefined management policies that are inherent to policy kernel 110 and support basic, predefined functions of OSS 100. Policy kernel 110 can request and implement any of native policies 120 on operational support system 100. This is a characteristic of a "policy-based" management system.

However, when a particular policy or behavior is not recognized by policy kernel 110 among native policies 120, a "behavioral exception" exists. A behavioral exception is any set of policies that is not covered by native policies 120 for various reasons, such as design mistake, user behavior, system requirements changes, system evolution or a non-verified feature of operational support system 100. Conventional policy-based management systems have difficulty handling behavioral exceptions.

In order to handle behavioral exceptions, a policy-enabled management system is provided herein. In the policy-enabled management system of the present invention, operational support system 100 additionally interfaces with one or more external policy management systems 130. External policy management systems 130 are used to provide handling of behavioral exceptions. Each external policy management system 130 is a well-defined, tested and separate policy management system. For example, external policy management system 130 may be a policy system managing customer billing, network security, network performance, etc.

It is a function of policy kernel 110 to determine how many and which external policy management systems 130 to apply to each behavioral exception. Policy kernel 110 maps the behavioral exceptions of operational support system 100 to the appropriate external policy management system(s) 130 best suited to handle the behavioral exception. Policy kernel 110 selects the appropriate external policy management system(s) 130 by evaluating the behavioral exception in light of the external policy management systems active at any given time.

As shown in FIG. 1, policy kernel 110 comprises one or more policy access points 140, which are controlled by a policy access point manager 150. Policy access points 140 provide the point of access between policy kernel 110 and external management systems 130 and act as entry gates for importing policies into policy kernel 110 from external policy management systems 130. Each policy access point 140 is associated with a specific external policy management system 130, such as billing, security, etc.

When policy kernel 110 selects an external policy management system 130 to satisfy a behavioral exception, policy access point manager 150 allows policy kernel 110 to enable or disable any or all policy access points 140. Once a particular policy access point 140 is enabled, external policies 132 from the external policy management system 130 dedicated to that policy access point may be imported by policy kernel 110 for implementation on operational support system 100.

In one embodiment, native policies 120 provide support functions, including, but not limited to: (1) inventorying all policy access points 140; (2) creating or invalidating policy access points 140; (3) controlling access through policy access points 140 by external policy management systems 130; (4) capturing behavioral exceptions and assigning appropriate external policy management systems 130 to them; (5) requesting handling of behavioral exceptions by external policy management systems 130; and (6) controlling the configuration of operational support system 100.

Figure 2:
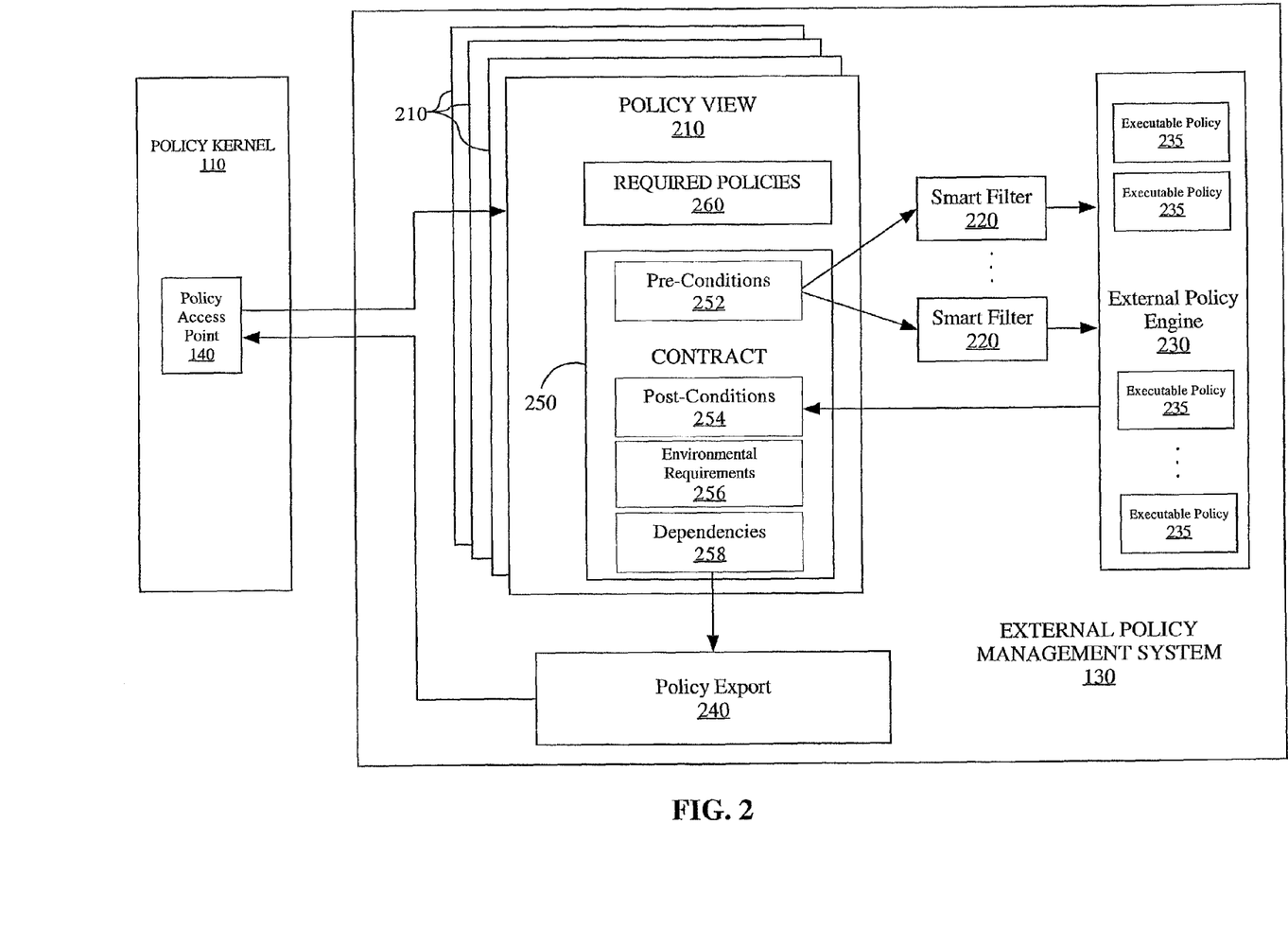
FIG. 2 illustrates an external policy management system of FIG. 1.

FIG. 2 illustrates a more detailed depiction of external policy management system 130 of FIG. 1. In one aspect of the invention, the policies and behaviors used by policy kernel 110 are described in the context of system views, as described above in reference to FIG. 1. FIG. 2 also illustrates the contract-based interface used to import external management policies to policy kernel 110 from external policy management system 130. As can be seen in FIG. 2, external policy management system 130 comprises one or more policy views 210. Each policy view 210 is a management model that includes one or more policies that are dedicated to the performance of some function, such as billing, performance, security, fault, etc.

Each policy view 210 comprises a contract 250 and a set of required policies 260. Required policies 260 are those policies needed to complete the requested policy view 210. Contract 250 provides a means for assuring that the requested policy view 210 is provided and that the appropriate policies are exchanged between external policy management system 130 and policy kernel 110. Additionally, external policy management system 130 comprises one or more smart filters 220, an external policy engine 230 and a policy export engine 240.

2.0 FUNCTIONAL OVERVIEW

Whenever policy kernel 110 requests policy view 210 to handle a behavioral exception, contract 250 is initiated and required policies 260 of the requested policy view 210 are implemented. As described above in reference to FIG. 1, a behavioral exception exists whenever a requested policy is not supported by native policies 120. In response, policy kernel 110 determines whether any known policy view 210 can provide the policy, and invokes that policy. Once the appropriate policy view 210 is invoked, contract 250 is initiated. The functions of contract 250 include, but are not limited to, identifying policy view 210, performing pre-conditions on the view, performing post-conditions on the view, applying environmental requirements to the post-conditions and resolving policy dependency issues. Each of these functions is described below.

Upon initiation, contract 250 evaluates the required policies 260 necessary to provide the requested policy view 210. Required policies 260 are evaluated against a set of pre-conditions 252 used by contract 250. Pre-conditions 252 contain information as to which particular policies associated with contract 250 can support the requested policy view 210. As shown in FIG. 2, contract 250 sends pre-conditions 252 through smart filter 220. Smart filter 220 evaluates pre-conditions 252 against one or more executable policies 235 available in external policy engine 230 that can support required policies 260 of policy view 210.

After smart filter 220 identifies one or more executable policies 235 that support required policies 260, external policy engine 230 sends a set of post-conditions 254 to contract 250. Post-conditions 254 contain information as to which particular executable policies 235 of those sought by pre-conditions 252 are actually available to support the requested policy view 210.

Contract 250 then evaluates the selected executable policies 235 against one or more environmental requirements 256. Environmental requirements 256 identify or define one or more particular running components that may be required for particular executable policies 235 to be enabled by policy kernel 110. For example, one environmental requirement 256 for a particular executable policy 235 may be language compilation by a particular compiler. In this case, contract 250 will run the required language compiler on executable policy 235 in order to enable it to be executed by policy kernel 110.

Contract 250 also contains a set of policy dependency rules 258 regarding the handling of conflicts or dependencies between executable policies 235 that are selected based on post-conditions 254. When the behaviors of two or more executable policies 235 selected using post-conditions 254 are in conflict with one another, contract 250 applies policy dependency rules 258 to executable policies 235. Contract 250 thus resolves conflicts between executable policies 235 prior to constructing the requested policy view 210 and importing by policy kernel 110.

Once environmental requirements 256 and policy dependency rules 258 are applied, a resultant set of one or more executable policies 235 are sent to policy export engine 240. Policy export engine 240 then exports executable policies 235 to policy access point 140 of policy kernel 110. External policies from external policy management system 130 can then be implemented by policy kernel 110 on operational support system 100.

Figure 3A:
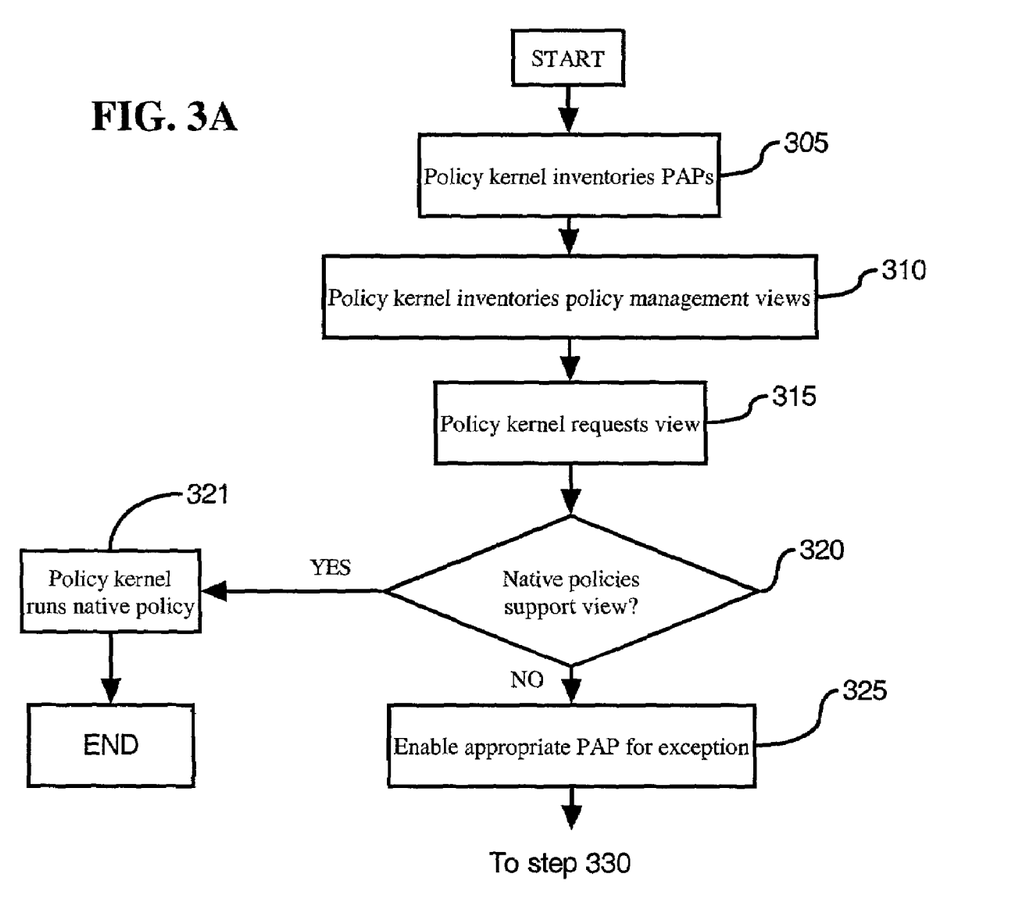
FIG. 3A and FIG. 3B are flow diagrams describing how external policies of the external policy management system are imported to a policy kernel of FIG. 1.
Figure 3B:
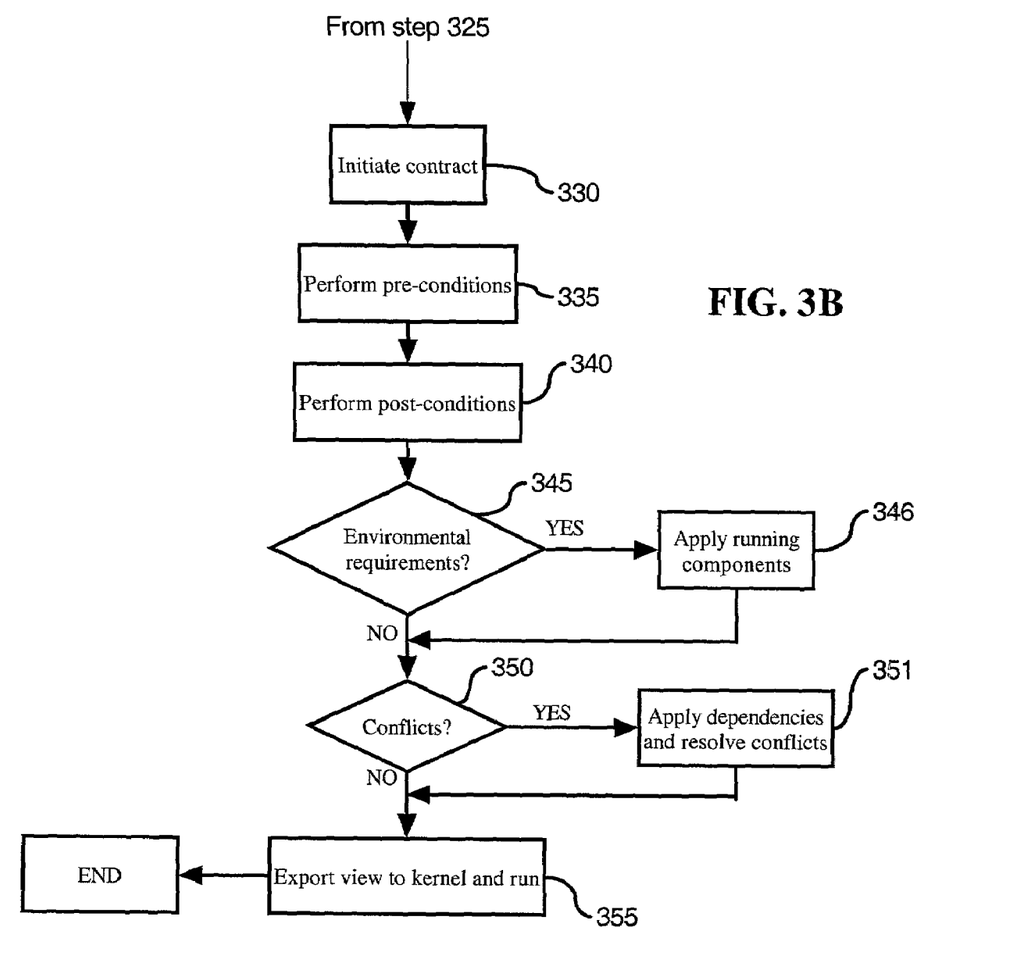

FIG. 3 is a flowchart describing how external policies of external policy management system 130 are imported by policy kernel 110 in one aspect of the invention.

The process starts in step 305 where policy kernel 110 inventories all policy access points 140 available to it through policy access point manager 150 (FIG. 1). The policy access points 140 available to policy kernel 110 will depend on the number of external policy management systems 130 mapped to particular behavioral exceptions of operational support system 100, described above in reference to FIG. 1.

Next, in step 310, policy kernel 110 inventories the number of policy views 210 (FIG. 2) available from each external policy management system 130. As described above in reference to FIG. 2, each external policy management system 130 comprises one or more policy views 210.

Once policy kernel 110 is able to discern particular policy views 210 available (from the policy views inventory) and location of the policy views 210 (from the policy access point inventory), policy kernel 110 is ready to request specific system views. In step 315, the required policy view 210 is requested by policy kernel 110. As described above in reference to FIG. 2, policy views 210 are management models that include a set of policies that are dedicated to the performance of some function, such as billing, performance, security, fault, etc.

In step 320, policy kernel 110 checks whether native policies 120 of policy kernel 110 can support the requested policy view 210. As described above in reference to FIG. 1, native policies 120 are a predefined set of policies or rules that are indigenous to policy kernel 110 of operational support system 100 based on user requirements. If native policies 120 can support the requested policy view 210, then policy kernel 110 runs the requested policy view 210 from native policies 120. No further interaction with external systems is required and the process ends.

If native policies 120 cannot support the requested policy view 210, then a behavioral exception exists. In step 325, policy kernel 110 enables a particular policy access point 140 corresponding to a specific external policy management system 130 mapped to handle the behavioral exception and containing the requested policy view 210.

In step 330, contract 250 of the requested policy view 210 is initiated, as described above in reference to FIG. 2. Contract 250 appraises required policies 260 and forms pre-conditions 252.

In step 335, contract 250 performs pre-conditions 252 by sending the required information to smart filter 220. Pre-conditions 252 report to smart filter 220 which policies are being sought. Smart filters 220 then examine external policy engine 230 for executable policies 235 that can support required policies 260.

In step 340, contract 250 performs post-conditions 254. As described above in reference to FIG. 2, post-conditions 254 contain information as to which particular executable policies 235 are available to support required policies 260 of requested policy view 210.

In step 345, contract 250 determines whether any of executable policies 235 from post-conditions 254 have any environmental requirements 256. If so, then in step 346 contract 250 applies appropriate running components to executable policies 235 in order to enable them to run on policy kernel 110.

In step 350, contract 250 determines whether the behaviors of any of executable policies 235 from post-conditions 254 are in conflict with one another. If so, then in step 351 contract 250 will apply policy dependency rules 258 and resolve the conflicts as described above in reference to FIG. 2.

Contract 250 has now completed all tasks required to best support required policies 260 of the requested policy view 210. Thus, in step 355, policy export engine 240 of external policy management system 130 exports executable policies 235 to policy access point 140 of policy kernel 110. Policy kernel 110 may now run the requested policy view 210 on operational support system 100.

3.0 IMPLEMENTATION MECHANISMS—HARDWARE OVERVIEW

Figure 4:
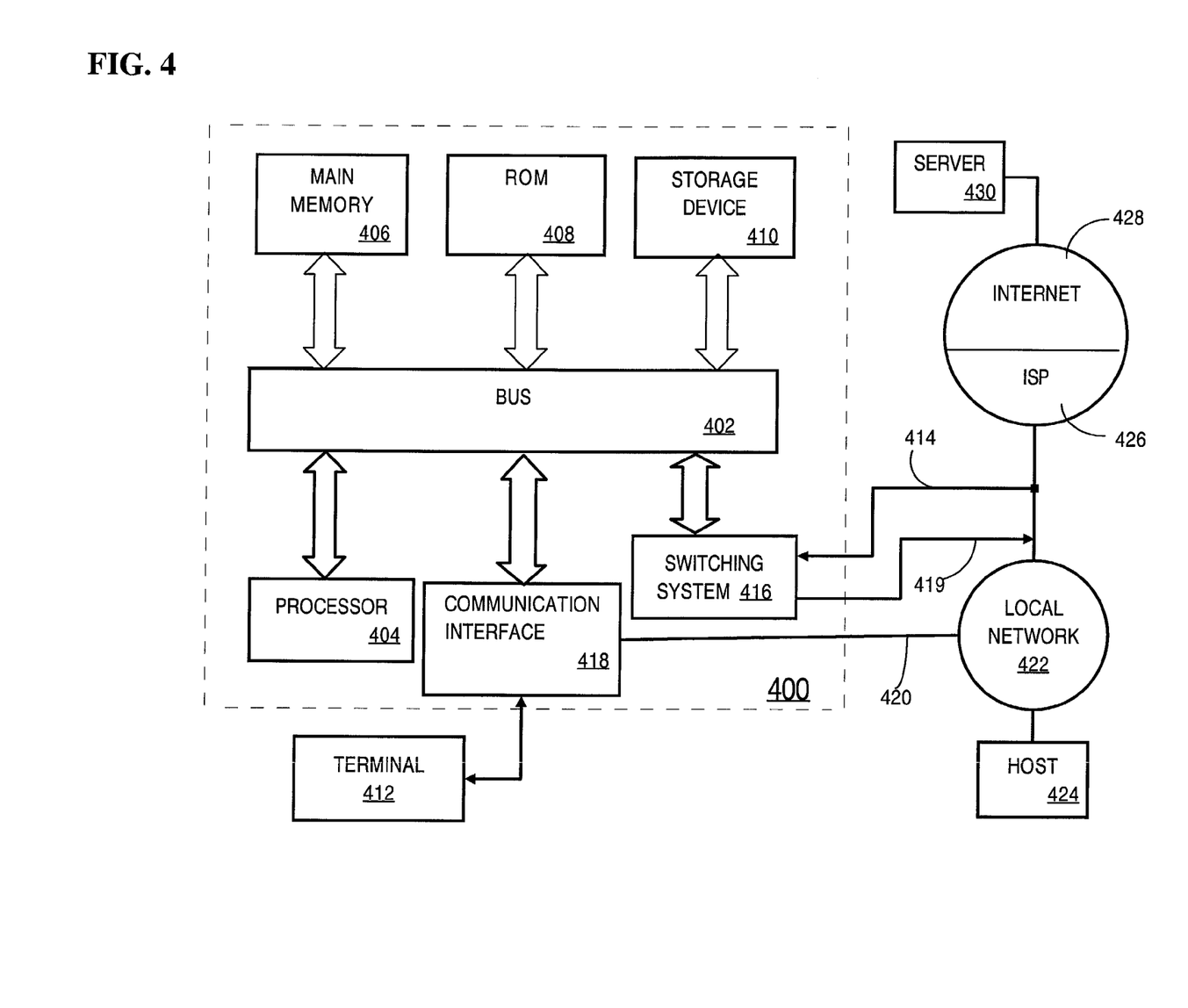
FIG. 4 is a block diagram illustrating a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for policy-enabled, contract-based management of operational support systems. According to one embodiment of the invention, policy-enabled, contract-based management of operational support systems is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for policy-enabled, contract-based management of operational support systems as described herein.

Processor 404 may execute the received code as it is received, and/or stored in storage device 410, or other non-volatile storage for later execution. In this manner, computer system 400 may obtain application code in the form of a carrier wave.

4.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for policy-enabled, contract-based management of a network operational support system that comprises a set of programs designed to support various network management functions, comprising the steps of:
   in response to a network system state change, receiving one or more conditions that represent the current state of the network system;
   determining whether native policies within the operational support system address the one or more conditions;
   in response to determining that the native policies do not address the one or more conditions,
      comparing the one or more conditions to one or more conditions addressed by one or more policy views of respective one or more policy management systems that are logically separate from the operational support system;
      based on comparing, determining at least one particular policy management system that addresses the one or more conditions that represent the current state of the network system;
      requesting a policy view from the at least one particular policy management system, wherein the policy view comprises a set of required policies that address one or more of the conditions that represent the current state of the network system;
   receiving one or more executable policies, from the at least one particular policy management system, capable of supporting the required policies of the requested policy view, wherein selection of the one or more executable policies is based on a contract that defines one or more criteria that the selected executable policies must satisfy; and
   implementing the requested policy view by executing the selected executable policies.

2. The method of claim 1 wherein the operational support system comprises a set of native policies indigenous to the operational support system, and further comprising the step of identifying a behavioral exception when none of the native policies is capable of supporting the requested policy view.

3. The method of claim 2 wherein the requesting step is carried out only in response to a behavioral exception in the operational support system.

4. The method of claim 1 wherein the requesting step further comprises the step of inventorying the available policy views of the policy management system.

5. The method of claim 1 wherein the policy management system comprises an external policy engine, further comprising the step of causing the policy view to initiate the contract for the selection and importation of the executable policies from the external policy engine.

6. The method of claim 5 wherein the contract comprises one or more pre-conditions, one or more post-conditions, one or more environmental requirements and one or more policy dependency rules.

7. The method of claim 6 further comprising the step of causing the contract to apply the environmental requirements to the selected executable policies to enable the selected executable policies to run on the operational support system.

8. The method of claim 6 further comprising the step of causing the contract to apply the policy dependency rules to two or more of the selected executable policies when the behaviors of the two or more selected executable policies are in conflict with one another.

9. The method of claim 1 wherein the policy management system comprises a policy export engine, and the receiving step further comprises the step of importing the selected executable policies from the policy export engine.

10. A method for policy-enabled, contract-based management of an operational support system that comprises a set of programs designed to support various network management functions, the method implemented by a policy kernel in the operational support system that is communicatively coupled to one or more policy management systems, comprising the steps of:
   in response to a network system state change, receiving one or more conditions that represent the current state of the network system;
   determining whether native policies within the operational support system address the one or more conditions;
   in response to determining that the native policies do not address the one or more conditions,
      comparing the one or more conditions to one or more conditions addressed by one or more policy views of respective one or more policy management systems that are logically separate from the operational support system;
      based on comparing, determining at least one particular policy management system that addresses the one or more conditions that represent the current state of the network system;
      requesting a policy view from the at least one particular management system, wherein the policy view comprises a set of required policies that address one or more of the conditions that represent the current state of the network system;

receiving one or more executable policies, from the at least one particular policy management system, capable of supporting the required policies of the requested policy view, wherein selection of the one or more executable policies is based on a contract that defines one or more criteria that the selected executable policies must satisfy; and implementing the requested policy view by executing the selected executable policies.

11. The method of claim 10 wherein the policy kernel comprises a set of native policies indigenous to the policy kernel, and further comprising the step of identifying a behavioral exception when none of the native policies is capable of supporting the requested policy view.

12. The method of claim 11 wherein the requesting step is carried out only in response to a behavioral exception in the policy kernel.

13. The method of claim 10 wherein the requesting step further comprises the step of inventorying the available policy views of the policy management system.

14. The method of claim 10 wherein the policy kernel comprises one or more policy access points, and further comprising the step of enabling the policy access points to provide an interface between the policy kernel and the policy management system.

15. The method of claim 14 further comprising the step of inventorying the available policy access points of the policy kernel.

16. The method of claim 14 wherein the policy access point is associated with a particular policy management system among a plurality of policy management systems.

17. The method of claim 14 further comprising the step of disabling the policy access point to terminate the interface between the policy kernel and the policy management system.

18. The method of claim 10 wherein the policy management system comprises an external policy engine, further comprising the step of causing the policy view to initiate the contract for the selection and importation of the executable policies from the external policy engine.

19. The method of claim 18 wherein the contract comprises one or more pre-conditions, one or more post-conditions, one or more environmental requirements and one or more policy dependency rules.

20. The method of claim 19 further comprising the step of causing the contract to apply the environmental requirements to the selected executable policies to enable the selected executable policies to run on the policy kernel.

21. The method of claim 19 further comprising the step of causing the contract to apply the policy dependency rules to two or more of the selected executable policies when the behaviors of the two or more selected executable policies are in conflict with one another.

22. The method of claim 10 wherein the policy management system comprises a policy export engine, and the receiving step further comprises the step of importing the selected executable policies from the policy export engine.

23. A method for policy-enabled, contract-based management of an operational support system that comprises a set of programs designed to support various network management functions, the method implemented by a policy kernel, wherein the policy kernel comprises one or more policy access points and each policy access point is associated with a particular policy management system, the method comprising the steps of:

inventorying the policy access points of the policy kernel;

inventorying one or more policy views from one or more of the policy management systems, wherein the policy view comprises a set of required policies that address one or more conditions that represent the state of a network system;

requesting one of the policy views from the inventory of policy views based on which policy view comprises one or more policies that address the current state of the network system being supported by the operational support system;

enabling the policy access point corresponding to the associated policy management system capable of supporting the requested policy view;

causing a contract of the requested policy view to be initiated for the selection of executable policies from an external policy engine of the policy management system;

causing the contract to apply environmental requirements to the selected executable policies to enable the selected executable policies to execute on the policy kernel;

causing the contract to apply dependency rules to two or more of the selected executable policies when the behaviors of the two or more selected executable policies are in conflict with one another;

importing the selected executable policies from a policy export engine of the policy management system; and implementing the requested policy view by executing the selected executable policies.

24. A computer-readable medium carrying one or more sequences of instructions for policy-enabled, contract-based management of a network operational support system that comprises a set of programs designed to support various network management functions, which instructions, when executed by one or more processors, cause the one or more processors to carry out the steps of:

in response to a network system state change, receiving one or more conditions that represent the current state of the network system;

determining whether native policies within the operational support system address the one or more conditions;

in response to determining that the native policies do not address the one or more conditions, comparing the one or more conditions to one or more conditions addressed by one or more policy views of respective one or more policy management systems that are logically separate from the operational support system;

based on comparing, determining at least one particular policy management system that addresses the one or more conditions that represent the current state of the network system;

requesting a policy view from the at least one particular policy management system, wherein the policy view comprises a set of required policies that address one or more of the conditions that represent the current state of the network system;

receiving one or more executable policies, from the at least one particular policy management system, capable of supporting the required policies of the requested policy view, wherein selection of the one or more executable policies is based on a contract that defines one or more criteria that the selected executable policies must satisfy; and implementing the requested policy view by executing the selected executable policies.

25. A system for policy-enabled, contract-based management of operational support systems that comprise a set of programs designed to support various network management functions, comprising:

means for receiving, in response to a network system state change, one or more conditions that represent the current state of the network system;

means for determining whether native policies within the operational support system address the one or more conditions;

means for comparing the one or more conditions to one or more conditions addressed by one or more policy views of respective one or more policy management systems that are logically separate from the operational support system;

means for determining at least one particular policy management system that addresses the one or more conditions that represent the current state of the network system;

means for requesting a policy view from the at least one particular policy management system, wherein the policy view comprises a set of required policies that address one or more of the conditions that represent the current state of the network system;

means for receiving one or more executable policies, from the at least one particular policy management system, capable of supporting the required policies of the requested policy view, wherein selection of the one or more executable policies is based on a contract that defines one or more criteria that the selected executable policies must satisfy; and means for implementing the requested policy view by executing the selected executable policies.

26. A system for policy-enabled, contract-based management of operational support systems that comprise a set of programs designed to support various network management functions, comprising:

a policy kernel for executing policies of a policy view on the operational support system; and one or more policy access points that are communicatively coupled to one or more policy management systems, the policy management system including one or more executable policies and one or more policy views, the policy views containing a set of required policies and a contract that defines one or more criteria that the executable policies must satisfy.

* * * * *